United States Patent [19]

Belzil

[11] Patent Number: 4,459,886
[45] Date of Patent: Jul. 17, 1984

[54] SHEARING APPARATUS TO CUT NOTCHES AT THE END OF PIPES AND THE LIKE

[76] Inventor: Rolland Belzil, 7630 Milan Blvd., Brossard, Canada, J4Y 1H5

[21] Appl. No.: 370,978

[22] Filed: Apr. 22, 1982

[51] Int. Cl.³ .......................... B26D 3/14; B23D 21/00
[52] U.S. Cl. ........................................ 83/178; 83/548; 83/578; 83/598; 83/610; 83/917
[58] Field of Search .................................. 83/178–195, 83/693, 917, 54, 548, 599, 598, 597, 610, 611, 612, 578

[56] References Cited

U.S. PATENT DOCUMENTS

| 387,408 | 8/1888 | Ganter | 83/610 |
| 2,704,124 | 3/1955 | Koster | 83/190 |
| 3,153,360 | 10/1964 | Coulon | 83/917 X |

FOREIGN PATENT DOCUMENTS 1096717  1/1961  Fed. Rep. of Germany ........ 83/917
Ad.15605  of 1913  United Kingdom ................. 83/597
521077  9/1976  U.S.S.R. ............................... 83/578

Primary Examiner—James M. Meister

[57] ABSTRACT

A shearing apparatus adapted to cut one or more notches at the end of a pipe and the like, to produce properly fitting endwise engagement of that end of the pipe against another pipe. This shearing apparatus features only one cycle of operation to cut two notches, no repositioning of the tubular member to cut more than one notch at one of its ends, and cutting of notches at any desired position around one end of a pipe without having to reposition the latter. This shearing apparatus includes a first die member having die sections positioned in predetermined radially outward directions relative to the end of the pipe to be notched, and a second die member that is pivotally displaceable in those directions to outwardly cut the notches against those die sections.

9 Claims, 15 Drawing Figures

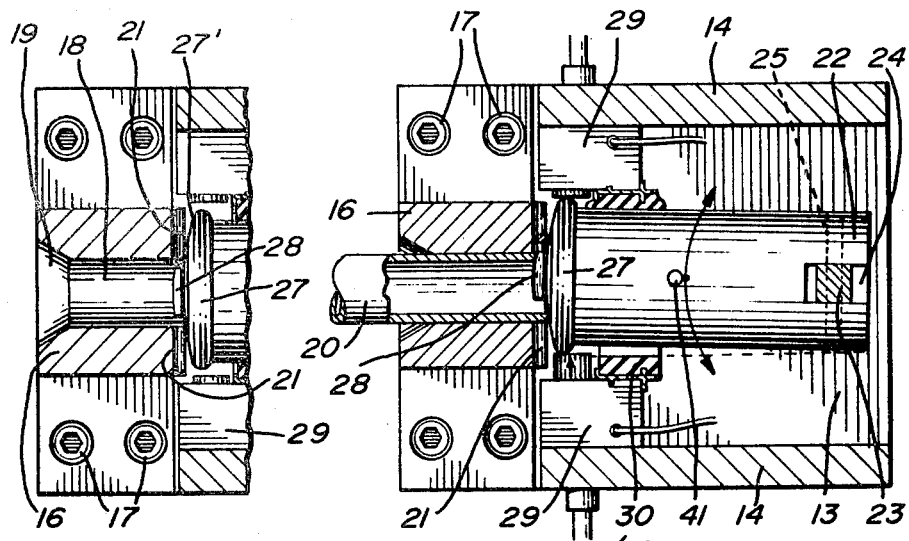
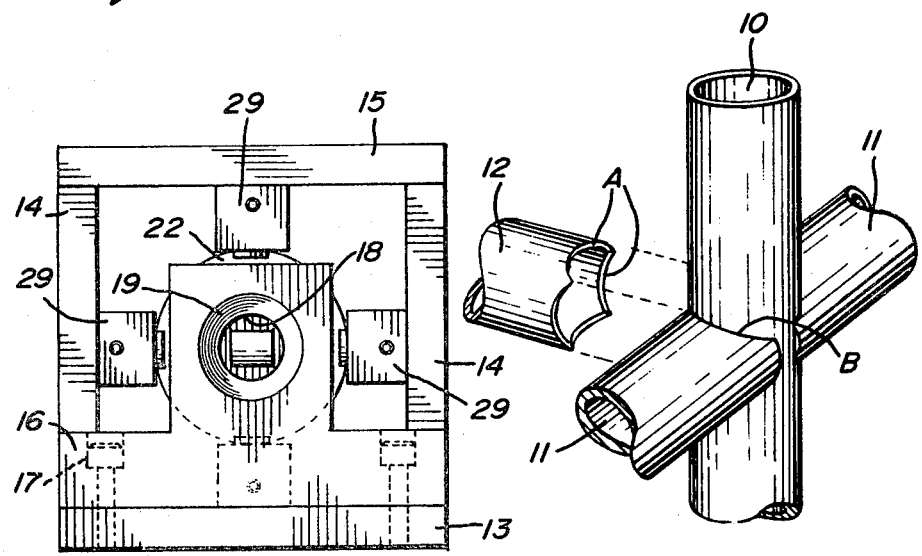

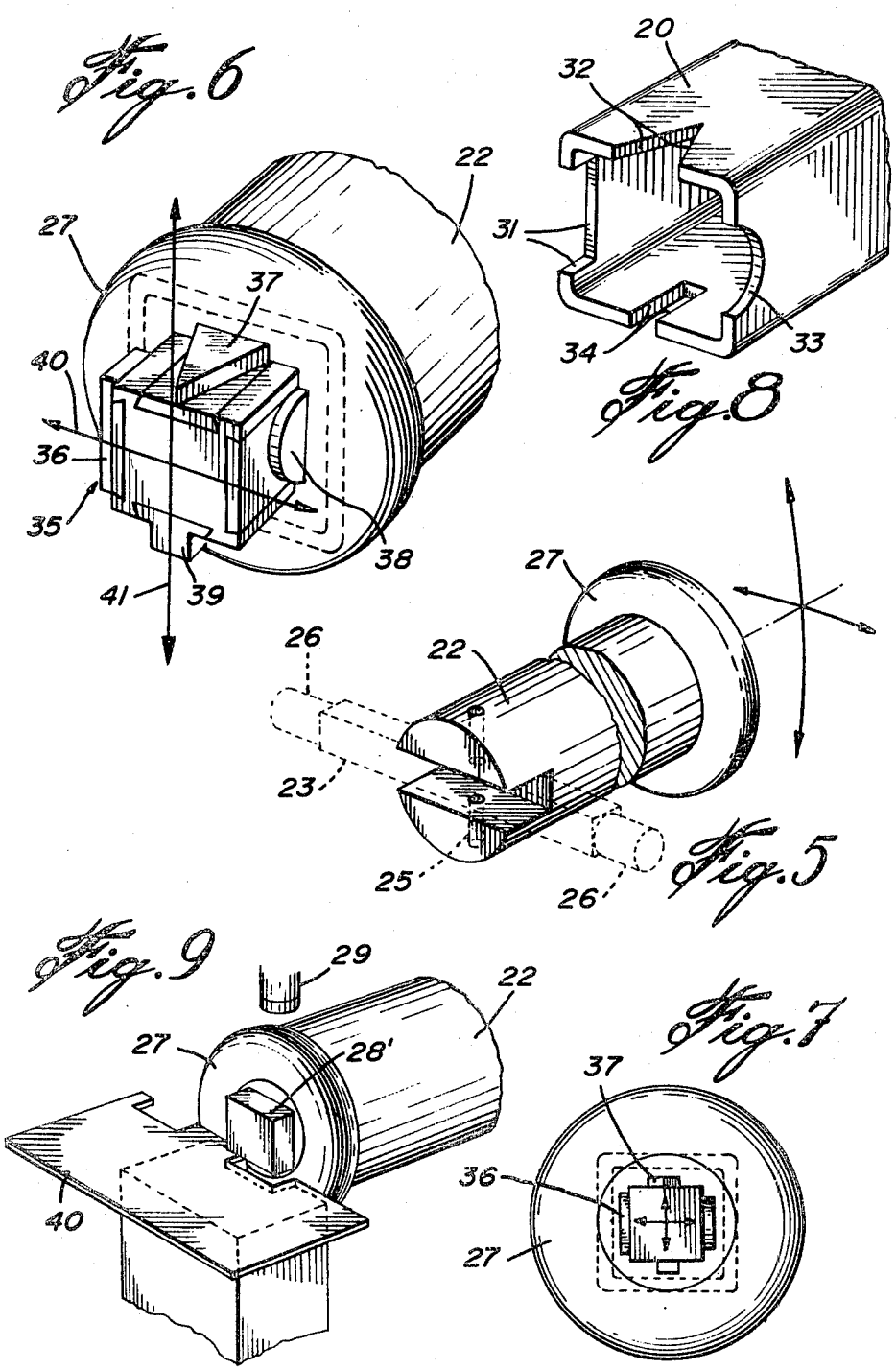

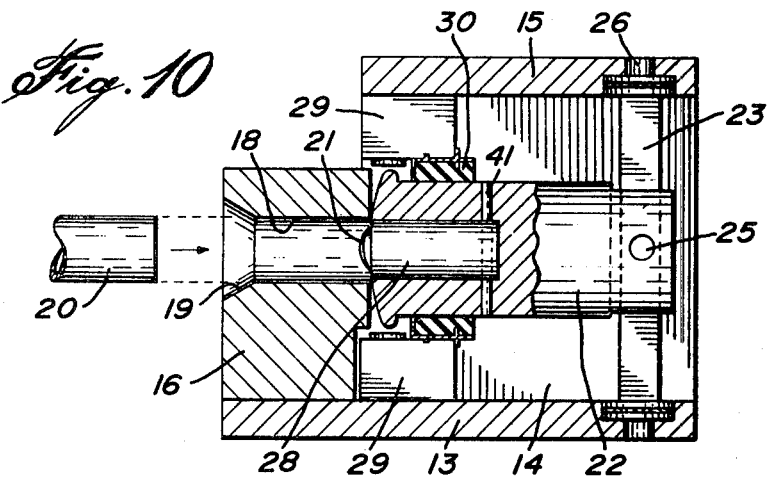
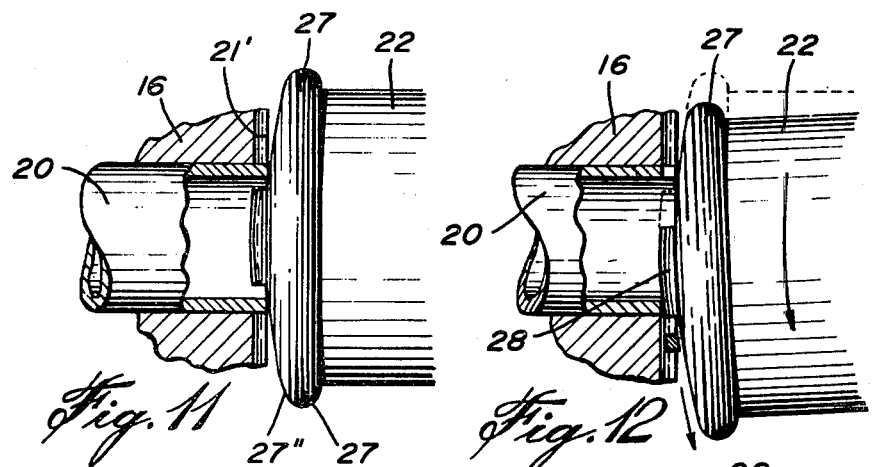
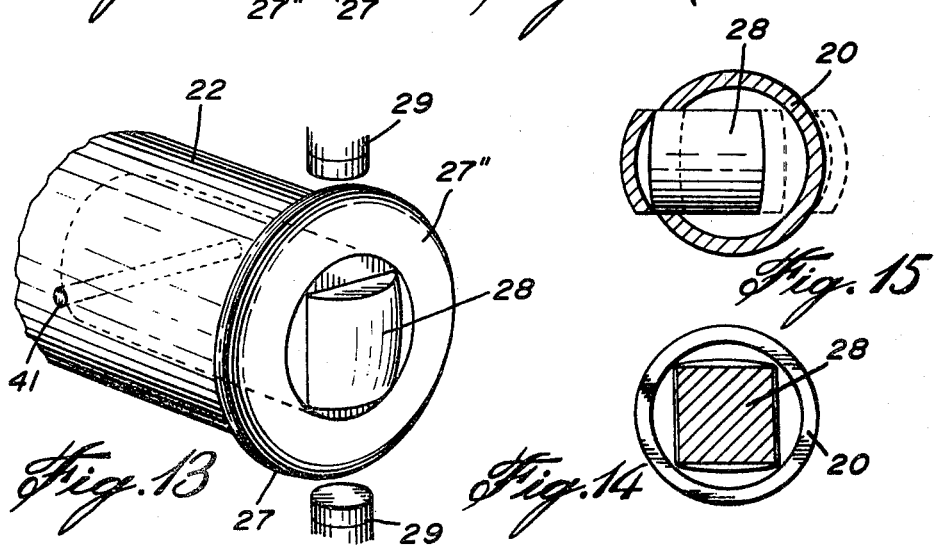

SHEARING APPARATUS TO CUT NOTCHES AT THE END OF PIPES AND THE LIKE

FIELD OF THE INVENTION

This invention relates to a shearing apparatus of the type that is adapted to cut notches at the end of one pipe for connection of that end to another pipe.

DESCRIPTION OF THE PRIOR ART

When pipes or the like tubular members are intersectively connected together, at least some of the pipes or tubular members must be made with notches, at least at one end, to provide proper contact with the curved outline of another pipe. This is done, for instance, to assemble pipes to form conventional scaffolds.

The shearing apparatuses of the above type which have been previously proposed to produce such notches require a separate cycle of operation for each notch that has to be cut and the work piece, or tubular member, has to be repositioned to successively register with each separate die. For instance, in the shearing apparatus defined in U.S. Pat. No. 3,073,195, the tubular member, or tube 12, is moved from recess 34 in die block 25 to recess 38 in die block 26 to successively cut the two diametrically-opposite notches. Such repositioning takes time and must be accurate to produce notches at exactly the right place around the tubular member. Besides, to provide for the repositioning, the corresponding shearing apparatus must be relatively complex.

SUMMARY OF THE INVENTION

It is a general object of the present invention to provide a shearing apparatus of the above type, which is constructed and arranged to cut two notches in the same cycle of operation.

It is another object of the present invention to provide a shearing apparatus of the above type, which does not require repositioning of the pipe or the like tubular member to cut more than one notch at one of its ends.

It is a further object of the present invention to provide a shearing apparatus of the above type, which is adapted to cut one or more notches at any desired position around one end of a pipe, or the like tubular member without repositioning of the latter.

BRIEF DESCRIPTION OF THE DRAWINGS

The above and other objects and advantages of the present invention will be better understood with reference to the following detailed description of preferred embodiments thereof, which are illustrated, by way of example, in the accompanying drawings, in which:

FIG. 1 is a perspective view of a pipe connection made with pipes of which one end has been notched for tight engagement endwise against another pipe;

FIG. 2 is a horizontal cross-section as seen through a shearing apparatus according to the present invention;

FIG. 3 is a view of a portion of FIG. 2 with no pipe shown in operative position in the apparatus;

FIG. 4 is an end view of the shearing apparatus as seen from the left in FIG. 3;

FIG. 5 is a perspective view of the pivotable support for one die member to illustrate its pivotal connection;

FIG. 6 is a perspective view of the head of the pivotable support with a predetermined set of die sections attached to it;

FIG. 7 is an end view of the pivotable support and associated die members shown in FIG. 6;

FIG. 8 is a perspective view of one end of a tube having notches cut by the set of die sections of FIGS. 6 and 7;

FIG. 9 is a perspective view of the same pivotable support and an associated die member used to cut notches along a straight edge of a plate.

FIG. 10 is a vertical cross-section, as seen through the shearing apparatus;

FIGS. 11 and 12 are enlarged views of part of FIG. 3 showing the notching operation.

FIG. 13 is a partial perspective view of the pivotable die support and associated die member as used for cutting only two diametrically-opposed notches in a pipe;

FIG. 14 is a cross-section of the movable die, seen inserted into the pipe to be notched; and FIG. 15 is a front end view of the movable die notching a pipe seen in cross-section.

DESCRIPTION OF THE PREFERRED EMBODIMENT

Pipes, tubes or the like tubular members are regularly connected intersectively one to another. This is done, for instance, to manufacture conventional scaffolds of circular or square tubing. Such connection is shown in FIG. 1. The joint in FIG. 1 includes a pipe 10 to which are intersectively secured a pair of pipes 11. The latter abut endwise against opposite sides of the pipe 10 and in alignment one with the other, each at 90° relative to the pipe 10. Another pipe 12 may be added at the joint substantially orthogonally relative to the pipes 10 and 11. As can be seen, each pipe 11 and 12 has its end formed with notches to tightly fit against the pipe 10. The shearing apparatus of the present invention is adapted to cut such notches at the ends of pipes, or the like tubular members.

The illustrated shearing apparatus comprises a base 13 operatively forming a frame in co-operation with opposite sides 14 and a top 15. A T-shaped block 16 is secured in inverted position on the base 13 and forms a first support to carry a die member. The first support 16 is removably secured on the base 13 by screws 17. A cylindrical aperture 18 extends through that first support and is open ended with one flared end 19. The aperture 18 and flared end 19 are provided for insertion and support of a tubular member or pipe 20, in the first support, as shown in FIG. 2.

A die member, in the form of four die sections 21, is secured against the face of the first support which is axially opposite relative to the flared end 19. The die sections 21 are positioned in radially outward directions relative to the aperture 18 and to the pipe 20.

A cylindrical body forms a second support 22 for a die member and extends in co-axial alignment with the cylindrical aperture 18. A pivotal connection pivotally secures the second support to the base 13. That pivotal connection includes a square cross-bar 23 extending in a transverse notch 24 in one end of the second support 22. A pin 25 pivotally holds the cross-bar 23 in the transverse notch 24. The cross-bar 23 is journalled at its opposite ends at 26 to pivotally connect to the base 13 and to the top 15. Thus, the pivotal connection defined by the cross-bar 23 and by pin 25 allows pivoting of the second support 22 in any angular direction about the universal pivot center defined by the cross-bar 23 and the pin 25. The end of the second support is provided with an enlarged head 27 having an end face 27' which is spherical within its center of curvature located at the universal pivot point defined by the afore-described pivotal connection.

A second die member 28 is secured against the curved end face of the head 27 and projects radially outward from it. The die member 28 is complementary to the die sections 21 and is sized to engage inside the proximate end of the pipe 20.

Four hydraulic pistons 29 are secured to the base 13, sides 14 and top 15 around the head 27 to radially push on the latter in anyone of the predetermined radially outward directions defined by the positions of the die sections 21. A ring 30, of resilient material, is fixed around the cylindrical second support 22 to centrally bias the latter.

When the second support 22 and the second die member 28 which it carries are pivoted radially outward in the direction of one die section 21, the complementary die elements 21 and 28 cut a notch of predetermined shape in the end of the tube, or pipe 20. Thus, without moving or repositioning the tube, or pipe 20, any feasible number of notches may be successively cut in one end of the tube or pipe. Pipe 20 is simply pushed against spherical end face 27' to obtain precise cuts. The embodiment described can cut the four notches A of curved shape in pipe 12, as shown in FIG. 1. However, as shown in FIGS. 6, 7, and 8, it is possible as well to cut notches of different shapes, such as 31, 32, 33, and 34 in FIG. 8, by providing the head 27 with a die member 35 having on its four sides a set of four die sections 36, 37, 38, and 39 appropriately shaped to cut such notches upon pivotal displacement in the appropriate radially outward direction, as suggested by the arrows 40 and 41.

The die members may be positioned in any feasible angular relationship around the axis of the tube, or pipe 20, and the hydraulic pistons 29 may be appropriately positioned and/or actuated to produce the required directions of radially outward displacement of the second support 22 and die member 28.

FIG. 9 shows how a flat plate 40 can be notched, using the second support 22 carrying appropriately-shaped die member 28' and actuated by the hydraulic piston 29. The support 22 may be mounted in the same manner as in the first embodiment, or pivoted for movement in only one plane.

FIGS. 11 to 15 show substantially the same apparatus as the first embodiment, but provided with only two oppositely-directed hydraulic pistons 29 moving alternately in opposite direction to successively cut diametrically-opposite notches B on the pipes 11 of FIG. 1. In this case, support 22 may be mounted for pivotal movement in only one plane. In such an embodiment, the end face 27" of the head 27 can be cylindrical, with its center of curvature coinciding with the pin 25.

FIG. 10 shows how the second die member is easily replaceable within the second support 22 by being removably inserted within a blind bore of the same and retained by a cross-pin 41.

It will be appreciated that two apparatuses in accordance with the present invention can be arranged to receive both ends of a precut pipe, so as to cut the required number of notches at both ends in the same operation.

What I claim is:

1. A shearing apparatus adapted to cut notches at one end of a tubular member and comprising a first and a second support, a first and a second complementary die member secured to said first and said second supports, respectively, and a base and a pivot connection defining a pair of perpendicular intersecting pivot axes and pivotally attaching the second support on the base; said first support being constructed and arranged to operatively carry one end of the tubular member, the first die member including die sections positioned in predetermined radially outward directions relative to the tubular member, the second support being constructed and arranged for pivotal displacement relative to the tubular member in said predetermined radially outward directions, and said second die member being operatively carried by the second support and shearingly engaging the tubular member upon bodily displacement with the second support in said predetermined radially outward directions toward co-operative engagement with said die sections.

2. A shearing apparatus as defined in claim 1, wherein the first support forms a cylindrical recess for the tubular member.

3. A shearing apparatus as defined in claim 2, wherein the cylindrical recess is open ended, including one flared end arranged for endwise engagement of the tubular member in the cylindrical recess, and with the other end of the cylindrical recess extending intermediate said die sections.

4. A shearing apparatus as defined in claim 1, wherein the second support includes an elongated member extending endwise toward the first support and having one end adjoining the first die member and operatively carrying the second die member and an opposite other end pivoted to the base by said pivot connection.

5. A shearing apparatus as defined in claim 4, wherein said one end of the second support includes a head having an outer face profiled in relation with the radial distance thereof from said pivot connection and having the second die member projecting therefrom away from the pivot connection.

6. A shearing apparatus as defined in claim 5, wherein hydraulic actuators are operatively mounted around said one end, operatively engage said head, and are constructed and arranged for selective pivoting of the second support in one of said predetermined radially outward directions.

7. A shearing apparatus as defined in claim 1, 4 or 5, wherein the point of intersection of said intersecting pivot axes is coaxial with the tubular member carried by said first support, and said second die member extends within the open end of said tubular member when the latter is carried by said first support.

8. A shearing apparatus as claimed in claim 6, further including a resilient ring extending around said second support and biasing said second support to a rest position in axial alignment with the tubular member carried by said first support 9. A shearing apparatus as defined in claim 6, wherein the point of intersection of said intersecting pivot axes is co-axial with the tubular member carried by said first support, and said second member extends within the open end of said tubular member when the latter is carried by said first support.

* * * * *